United States Patent [19]

Hartman et al.

[11] Patent Number: 5,076,237
[45] Date of Patent: Dec. 31, 1991

[54] MEANS AND METHOD FOR MEASURING AND CONTROLLING SMOKE FROM AN INTERNAL COMBUSTION ENGINE

[75] Inventors: Peter G. Hartman, Worcester; Steven L. Plee, Northborough, both of Mass.

[73] Assignee: Barrack Technology Limited, Perth, Australia

[21] Appl. No.: 463,395

[22] Filed: Jan. 11, 1990

[51] Int. Cl.⁵ .............................................. F02M 51/00
[52] U.S. Cl. ................................... 123/489; 123/494; 123/478; 204/424
[58] Field of Search ............... 123/494, 425, 489, 589, 123/440, 478, 435; 73/35, 118, 346, 116; 350/96.10, 96.20, 61; 250/227, 554; 356/44, 241, 315, 417; 200/424

[56] References Cited

U.S. PATENT DOCUMENTS

| | | | |
|---|---|---|---|
| 4,369,748 | 1/1983 | Steinke et al. | 123/425 |
| 4,397,283 | 8/1983 | Komaroff et al. | 123/494 |
| 4,419,212 | 12/1983 | Dietz et al. | 204/424 |
| 4,444,169 | 4/1984 | Kirisawa et al. | 123/344 |
| 4,541,272 | 9/1985 | Bause | 73/118 |
| 4,594,968 | 6/1986 | Degobert et al. | 123/494 |
| 4,706,630 | 11/1987 | Wineland et al. | 123/478 |
| 4,739,731 | 4/1988 | Habich et al. | 123/494 |
| 4,770,129 | 9/1988 | Miyata et al. | 123/494 |

OTHER PUBLICATIONS

H. Hiroyasu, M. Arai and K. Nakanishi, Soot Formation and Oxidation in Diesel Engines, Copyright 1980 Society of Automotive Engineers, Inc.
Diesel Engine Sensing Techniques, Automotive Engineering, Jun. 1988.

*Primary Examiner*—Raymond A. Nelli
*Attorney, Agent, or Firm*—Harness, Dickey & Pierce

[57] ABSTRACT

A means and method for measuring and controlling smoke emissions from an internal combustion engine using a luminosity probe which measures the luminosity of soot in a combustion chamber of the engine. The luminosity signals generated by the probe are then used to measure smoke emissions based on an equation developed by the inventors which correlates the actual smoke being emitted from the exhaust with a predicted smoke emission value resulting from the luminosity signals. This smoke emission measurement can, in turn, be used in an engine control loop to control smoke emissions.

28 Claims, 4 Drawing Sheets

Figure 2: Computation of SOL and EOL

Actual vs. Predicted Bosch Smoke Level

- Only luminosity parameters are contained in the empirical model
- Data includes independent variations in engine speed, injection timing air-fuel ratio, and intake manifold pressure
- Other parameters were held constant
- Smoke was measured at conditions below 30 air-fuel ratio only

MEANS AND METHOD FOR MEASURING AND CONTROLLING SMOKE FROM AN INTERNAL COMBUSTION ENGINE

BACKGROUND OF THE INVENTION

This invention relates to a means and method for measuring and controlling smoke from an internal combustion engine, and more particularly to a means and method for measuring soot emissions from a diesel engine which can also be used for adjusting at least one (1) parameter of the engine to control soot emissions.

With modern technology and electronics, many of the components and running conditions of an internal combustion engine can be controlled more accurately than with previous mechanical systems. For example, the control of the air/fuel ratio, spark timing, fuel injection timing and pulse, and other adjustable factors of engine operation are greatly facilitated through the use of electronic components and electronic computers. However, in order to accurately sense the running of the engine and the combustion during each combustion cycle, it is necessary to provide a sensor that is directly positioned within the combustion chamber or in proximity to it and which senses the actual combustion conditions in the chamber.

It has been understood that knocking can be determined by an optical sensor that operates within the combustion chamber and which senses the luminosity of the gases in that chamber. A wide variety of knock detectors have been proposed that employ such sensors. It has also been shown that the luminosity of soot in a diesel combustion chamber is related to black smoke (Bosch smoke) or soot emissions from a diesel engine. See for example, "Soot Formation and Oxidation in Diesel Engines" by H. Hiroyasu, M. Arai and K. Nakanishi.

However, the inventors have discovered that a luminosity signal indicative of soot in a combustion chamber can be measured using gain independent parameters and the measurements used to develop an equation which correlates the actual Bosch smoke being emitted from the exhaust with a predicted Bosch smoke value resulting from the luminosity signals. The inventors have also found that the Bosch smoke being emitted from the exhaust of an engine can be measured directly from the output signals of a luminosity probe. The inventors have also discovered that these luminosity signals and Bosch smoke measurements can be used in connection with an engine control loop for controlling Bosch smoke emissions by adjustment of one or more of the engine parameters so as to maintain a desired luminosity and thereby to maintain a desired level of Bosch smoke emissions. The inventors have also found that such measurement and control can be done independent of variations in engine parameters such as engine speed, fuel delivery, air/fuel ratio, intake manifold pressure, intake manifold temperature, compression ratio differences, injection system variations and fuel characteristics.

Although the measurement and control of exhaust smoke is important in all internal combustion engines, it is particularly important on diesel engines where the smoke and particulate emissions are high compared to such emissions in spark ignited engines. It has also been shown that under high smoke conditions (rich air/fuel ratios) Bosch smoke emissions and particulate emissions are the same but that these emissions differ under low smoke operation. The measurement and control of exhaust emissions is also important from an emissions standards standpoint. The use of the diesel engine in the future will be largely dependent on whether it can meet future emissions standards. For this reason, the inventors have performed their studies on a diesel engine, although the invention is applicable to spark ignited engines operating under high smoke conditions and stratified charge engines as well.

It is, therefore, a principal object of this invention to provide a means and method for measuring smoke emissions from an internal combustion engine on the basis of the luminosity of soot detected in the combustion chamber.

It is a further object of this invention to provide a means and method for measuring smoke emissions from an internal combustion engine independent of variations in engine parameters.

It is a still further object of this invention to provide a means and method for measuring smoke emissions from an internal combustion engine on a cycle to cycle and on a chamber to chamber basis. An average luminosity signal can also be obtained to measure smoke emissions over a period of several cycles.

It is yet a further object of this invention to provide a means and method not only for measuring smoke emissions in an internal combustion engine, but for controlling such emissions as well on the basis of the luminosity signals.

Engine sensors have been proposed that will detect the actual luminosity of the gases within the combustion chamber. A wide variety of patents illustrating and describing the use of such sensors have issued including the following:

U.S. Pat. Nos. 4,358,952; 4,369,748; 4,377,086; 4,393,687; 4,409,815; 4,412,446; 4,413,509; 4,419,212; 4,422,321; 4,422,323; 4,425,788; 4,468,949; 4,444,043; 4,515,132

For the most part, these patents disclose arrangements wherein the sensor is utilized to sense only total luminosity and to equate the luminosity signal to a knocking signal.

However, the inventors have discovered that the luminosity signal from a particular type of sensor used to detect soot within the combustion chamber, can be employed to directly measure soot emissions, and that this signal can further be used to adjust the engine parameters to control such emissions.

SUMMARY OF THE INVENTION

This invention is adapted to be embodied in an internal combustion engine, preferably a diesel engine, having at least (1) combustion chamber. The invention includes means for delivering fuel into the combustion chamber, means for delivering air to the combustion chamber and means for causing combustion to occur within the combustion chamber. In accordance with one feature of the invention, means for detecting the luminosity of soot in the combustion chamber is provided as well as means for measuring exhaust soot emissions from the engine on the basis of output signals from the luminosity detecting means.

In accordance with another feature of the invention, the luminosity signals and exhaust soot emission measurement are used for adjusting at least one (1) parameter of the engine to maintain a desired luminosity so as to control exhaust emissions.

In accordance with yet another feature of the invention the exhaust soot emissions are measured independent of variations in engine parameters, for example engine speed, fuel delivery, air/fuel ratio, intake manifold pressure, intake manifold temperature, compression ratio differences, injection system variations and fuel characteristics.

A still further feature of the invention is adapted to be embodied in a multi-cylinder engine, wherein means for detecting the luminosity of soot in each combustion chamber is provided so as to measure exhaust soot emissions from the engine.

A further feature of the invention provides for measurement of exhaust soot emissions on a cycle to cycle basis, and in multi-cylinder engines on a chamber to chamber basis.

Yet another feature of the invention includes a method for measuring smoke from an internal combustion engine which has at least one (1) combustion chamber, comprising the steps of delivering fuel into the combustion chamber, delivering air to the combustion chamber, causing combustion to occur within the combustion chamber, detecting the luminosity of soot in the combustion chamber, and measuring exhaust soot emissions from the engine on the basis of the luminosity signals. This method can also include the step of adjusting at least one (1) parameter of the engine to maintain a desired luminosity so as to control exhaust emissions.

DETAILED DESCRIPTION OF THE PREFERRED EMBODIMENTS

Figure 1:
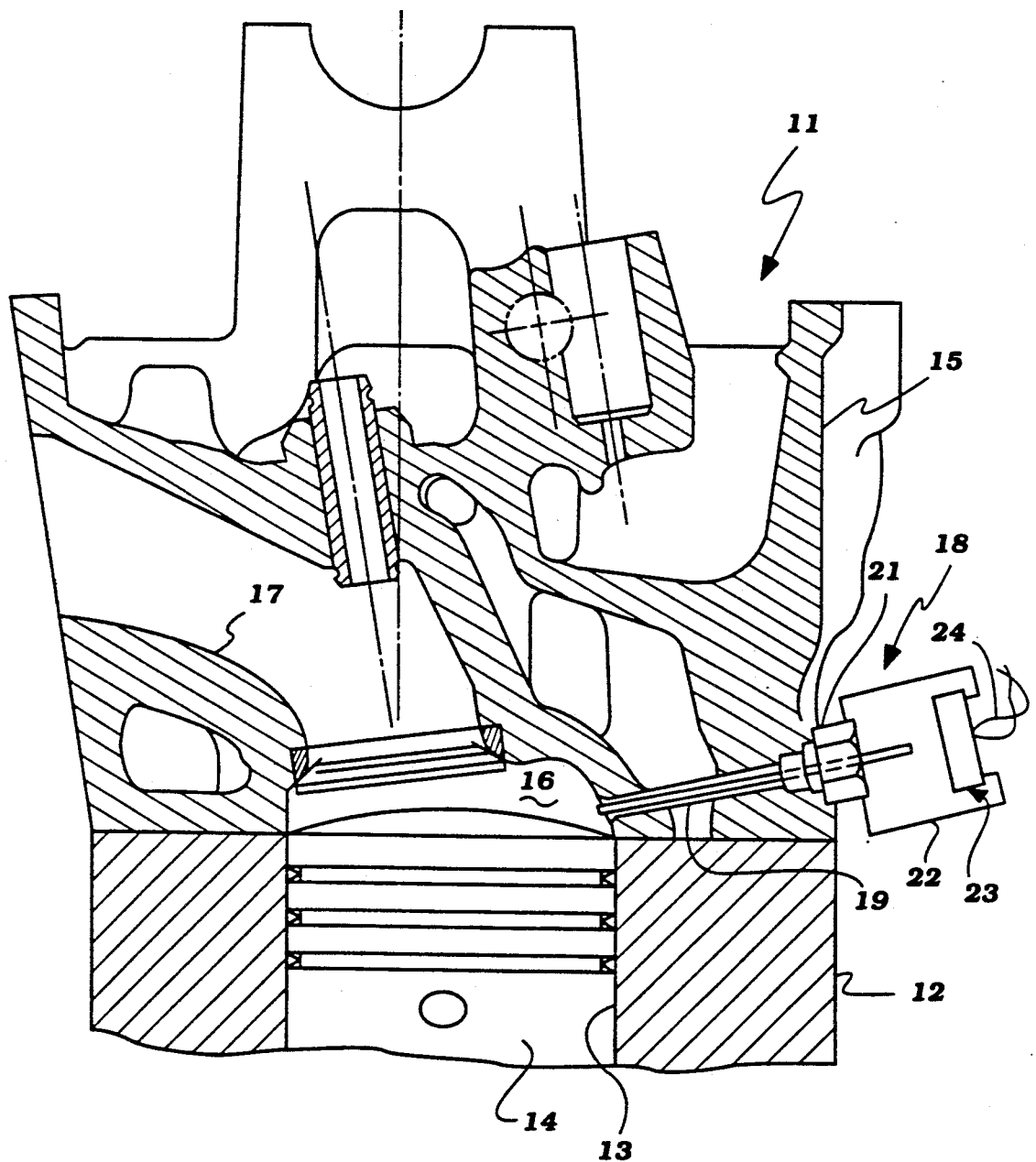
FIG. 1 illustrates a cross-sectional view taken through a single combustion chamber of a multi-cylinder internal combustion engine constructed and operated in accordance with the embodiments of the invention.

Referring to FIG. 1 of the drawings, a multiple cylinder internal combustion engine is identified generally by the reference numeral 11. It is to be understood that, although the invention has utility in multiple cylinder engines, certain facets of the invention are applicable in single cylinder engines as well. Also, although the invention is described in conjunction with a reciprocating type engine, the principles of the invention may be utilized with engines of the non-reciprocating type, such as rotary engines, and with engines operating on either two-stroke or four-stroke cycles.

Inasmuch as the invention primarily concerns the combustion chamber and the conditions therein, only a cross-sectional view taken through one of the combustion chambers is believed to be necessary to understand the invention. This cross-sectional view shows a cylinder block 12 having a cylinder bore 13 in which a piston 14 is supported for reciprocation. The piston 14 is connected by means of a connecting rod (not shown) to a crankshaft for providing output power to the engine.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with the combustion chamber 16 controlled by poppet type intake and exhaust valves (not shown) for admitting a charge to the combustion chamber 16 and for discharging the burnt charge from the combustion chamber 16. It is to be understood, of course, that the combustion chamber 16 may have a plurality of intake and exhaust valves and that the engine 11 may include a plurality of combustion chambers 16.

The charge admitted to the combustion chamber 16 may comprise pure air or an air/fuel mixture that is formed by a suitable charge former such as a port or throttle body type fuel injector, or carburetor. Alternatively, if pure air is delivered, direct cylinder injection or manifold injection may be employed for delivering fuel into the combustionchamber 16 to form the air/fuel mixture. The fuel delivery and thus the air/fuel ratio may be controlled in any of a wide variety of known manners such as by means of throttle valves, fuel control valves, injection duration, injection timing, injection pulse, etc. In accordance with the invention, these parameters may be adjusted manually or automatically as part of an engine control loop so as to control the air/fuel ratio and exhaust emissions.

The engine 11 may be of the diesel or spark ignited type, although the invention has particular utility in diesel engines because soot formation and emission is much more prevalent in diesel engines. Accordingly, the following discussion is concerned primarily with a diesel engine. However, the invention is also useful in spark ignited engines operating under high smoke conditions. If the engine is of the diesel type, combustion is initiated through the timing of the direct cylinder fuel injection, manifold injection or in any of the other known manners normally employed in connection with diesel engines. In accordance with the invention, these parameters may also be adjusted so as to control combustion timing and duration which, in turn, controls exhaust emissions. If, on the other hand, the engine 11 is of t he spark ignited type, a spark plug will be carried in the cylinder head 15 and have its gap exposed in the combustion chamber 16. The spark timing is controlled by a suitable mechanism which may be of any conventional type.

As has been previously noted, the invention is capable of being employed in a wide variety of conventional types of internal combustion engines and, for that reason, the details of the engine construction are not necessary to understand how the invention can be practiced by those of ordinary skill in the art.

However, in accordance with the invention there is provided in the combustion chamber 16 a luminosity detector, indicated generally by the reference numeral 18. The luminosity detector 18 includes a fiber optic probe 19, preferably an L-Probe or Witze Probe which extends through the cylinder head 15 and has its end terminating at the combustion chamber 16. The fiber optic probe 19 is preferably of the type described in the application entitled "Luminosity Detector", Ser. No. 284,193, filed Dec. 14, 1988. The probe 19 can be formed from a relatively inexpensive material such as synthetic sapphire ($Al_2O_3$) or other materials having similar characteristics. A probe having a diameter of 0.06 inches has been found to be practical and makes it relatively easy to install in the cylinder head.

The fiber optic probe 19 is held in place by means of a compression fitting and has its outer end disposed within a light sealed housing 22 in proximity to a detector 23 preferably made of silicon. The L-probe has particular utility for use in a diesel engine because it will measure soot in the combustion chamber. This L-probe will also detect gas, although it is believed that the majority of the radiation in a diesel combustion chamber is from soot except perhaps very early or very late in the engine cycle.

Although it may be desirable to provide a monochromator in front of a detector used to sense gases within the combustion chamber, it has been found that the soot radiation measurement in the diesel engine does not require a monochromator or an optical filter in front of the detector 23 so as to select the desired wavelength of light which is being measured. The wavelength range is limited only by the characteristics of the silicon potodector 23, which for this application is typically between 400 and 1000nm. These figures are exemplary only and various modifications may be employed within the scope of the invention.

The detector 23 is connected to a remotely positioned computer control unit by means of conductors 24. In addition to receiving the luminosity signal from the detector 23, this control unit, which may measure certain engine parameters, may also receive signals from other sensors normally employed on the engine, for example intake manifold pressure and temperature, and engine speed. As has been noted, these types of sensors are normally employed with modern internal combustion engines and their signals can be processed in conjunction with the luminosity signal to control exhaust emissions.

The remotely positioned control unit may be of any suitable type and is particularly adapted to transmit the signal from the detector 23 into an output indicative of luminosity of soot within the combustion chamber 16. This luminosity signal may be used to sense the amount of soot within the combustion chamber 16 during each cycle of operation and may also be used to sense variations from chamber to chamber.

It has been discovered that exhaust emissions, particularly soot emissions, can be determined by the luminosity probe 18 in a diesel engine and the signals employed to adjust parameters of the engine such as fuel delivery including injection timing and duration to control the combustion process and therefore to control such emissions. The control circuitry and mechanism for adjusting engine parameters such as fuel injection timing or duration in response to the luminosity signals are believed to be within the scope of those of ordinary skill in the art once they understand how the luminosity signal can be used to measure actual soot emissions.

The majority of the diesel combustion process is characterized by a turbulent diffusion flame instead of a hydrocarbon flame from a premixed mixture which occurs in spark ignited engines. As a result, the gas emission is normally overwhelmed by the soot emission from the diffusion flame which makes the flame yellow. Unlike emission from gaseous components, soot radiation varies continuously with wavelength. For example, a soot particle at 2000° K. will emit radiation continuously between 200nm and 100,000nm. The radiation intensity at a given wavelength is a function of soot temperature, quantity of soot present, and soot emissivity.

The inventors have found that the luminosity of soot measurement, and more particularly, the end of luminosity in relation to crank angle, can be used to measure actual black smoke (Bosch smoke) or soot emissions, and it has also been found that this measurement can be used to control Bosch smoke emissions. This luminosity measurement and correlation to actual Bosch smoke emissions is performed as hereinafter described.

Figure 2:
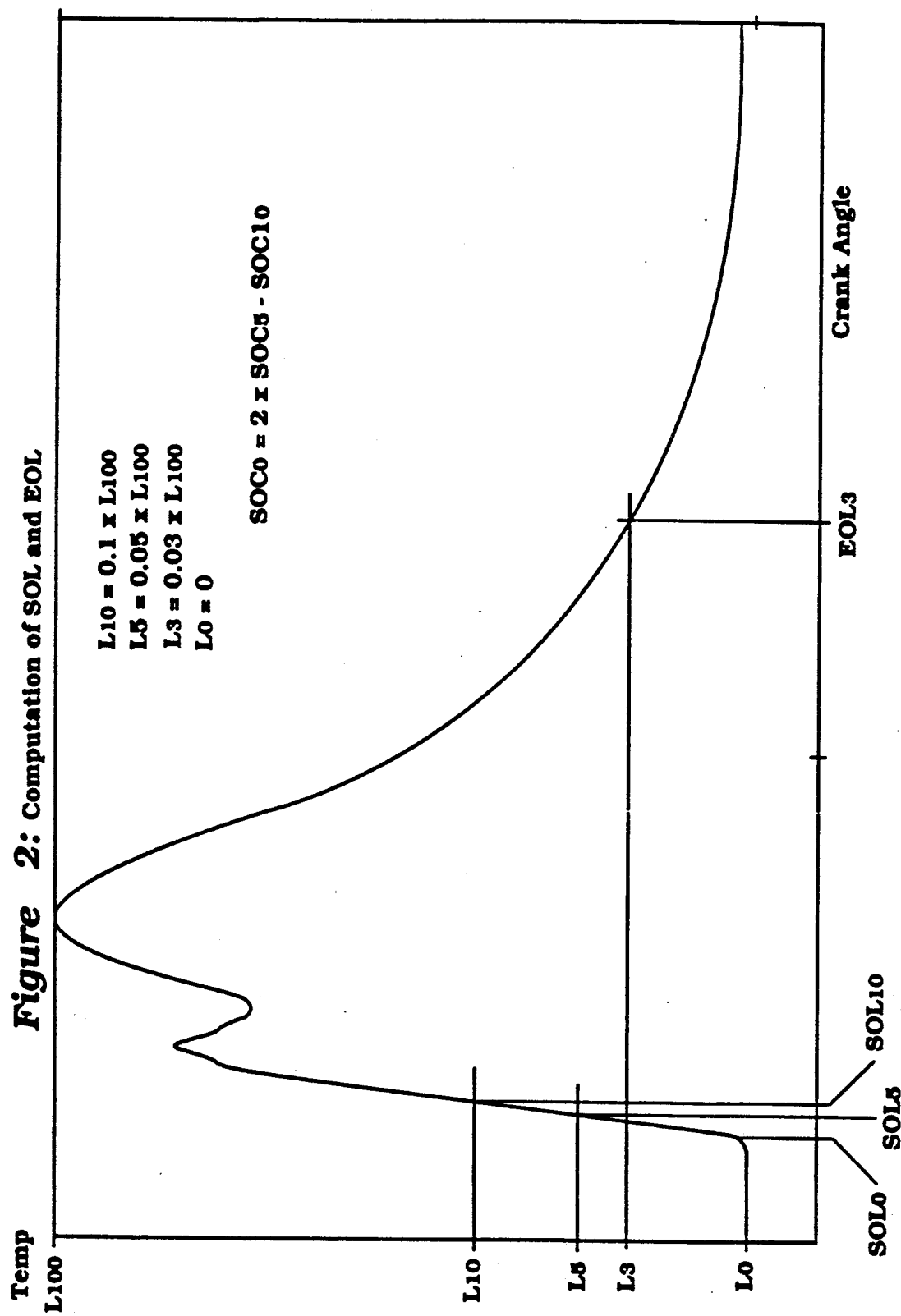
FIG. 2 graphically shows how the crank angles at the star and end of luminosity are measured using gain independent parameters.

The crank angles at the start and end of luminosity have been used in measuring Bosch smoke. FIG. 2 indicates how these two angles are measured using gain independent parameters which are not affected by variations in the gain of the system as are gain dependent parameters. The location in crank angle degrees of peak luminosity and the locations in crank angle degrees at which the luminosity is a certain percentage of the peak are examples of gain independent parameters. As long as the luminosity signal does not go to zero, the location of these luminosity points will remain the same regardless of gain changes. In other words, the inventors are using the shape of the curve rather than the amplitude to correlate their data. The crank angle at the start of luminosity (SOL) is determined using gain independent thresholds. The angles at which the luminosity signal exceeds 5% and 10% of the peak luminosity are determined. Extrapolation is then used to determine the effective crank angle at zero luminosity.

The crank angle at the end of luminosity (EOL) is determined in a similar fashion using a 3% gain independent threshold. This angle is determined when the luminosity signal goes below a threshold of 3%. These thresholds used in determining SOL and EOL are exemplary only and it should be noted that other thresholds can be used with similar results such as 5% and 10% for determining EOL. The thresholds chosen have shown good results for the data obtained. Also, for both SOL and EOL, these measurements can be performed so as to detect variations from cycle to cycle or average luminosity.

Other parameters may also be applicable to the Bosch smoke measurement including the location in crank angle degrees at which the luminosity if 5% of the peak luminosity, the start of luminosity defined as the crank angle at which the luminosity is 5% of the total integrated luminosity, the end of luminosity defined as the crank angle at which the luminosity is 90% of the total integrated luminosity and luminosity duration defined as the end of luminosity—the start of luminosity in crank angle degrees.

Using the SOL and EOL measurements, a linear correlation model has been developed that correlates the actual Bosch smoke emitted from the exhaust with the predicted Bosch smoke level as determined by the luminosity measurement within the combustion chamber. The following model has been found to have good correlation:

$$Bosch\ smoke\ number = C_1\ (SOL_0) + C_2\ (EOL_3) + C_3.$$

$C_1$, $C_2$ and $C_3$ represent constants in the equation.

Figure 3:
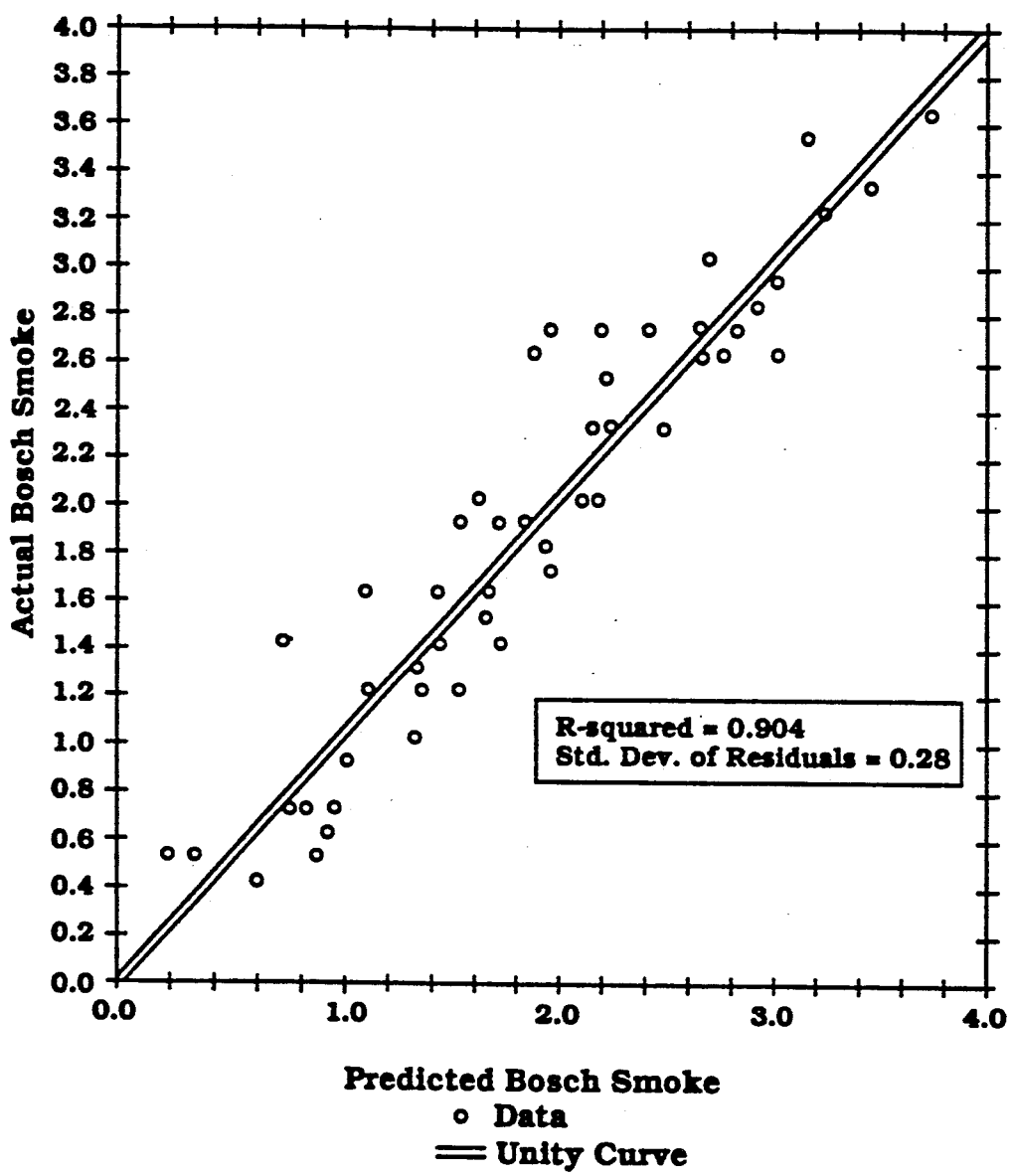
FIG. 3 shows the correlation between actual and predicted Bosch Smoke levels which has been developed using the start and end of luminosity measurements.

The results of this model are shown in FIG. 3. Good correlation between predicted (model) smoke an actual smoke is shown with an R-squared value of 0.904 and a standard deviation of residuals of 0.028 Bosch smoke. Only luminosity parameters were used in developing this model. However, this data includes variations in engine parameters such as engine speed, fuel delivery, air/fuel ratio, intake manifold pressure, intake manifold temperature, compression ratio differences, injection system variations and fuel characteristics. Using this equation and the luminosity signal generated as a result of the detection of soot in the combustion chamber, it is now possible to measure the actual Bosch smoke being emitted from the exhaust.

Figure 4:
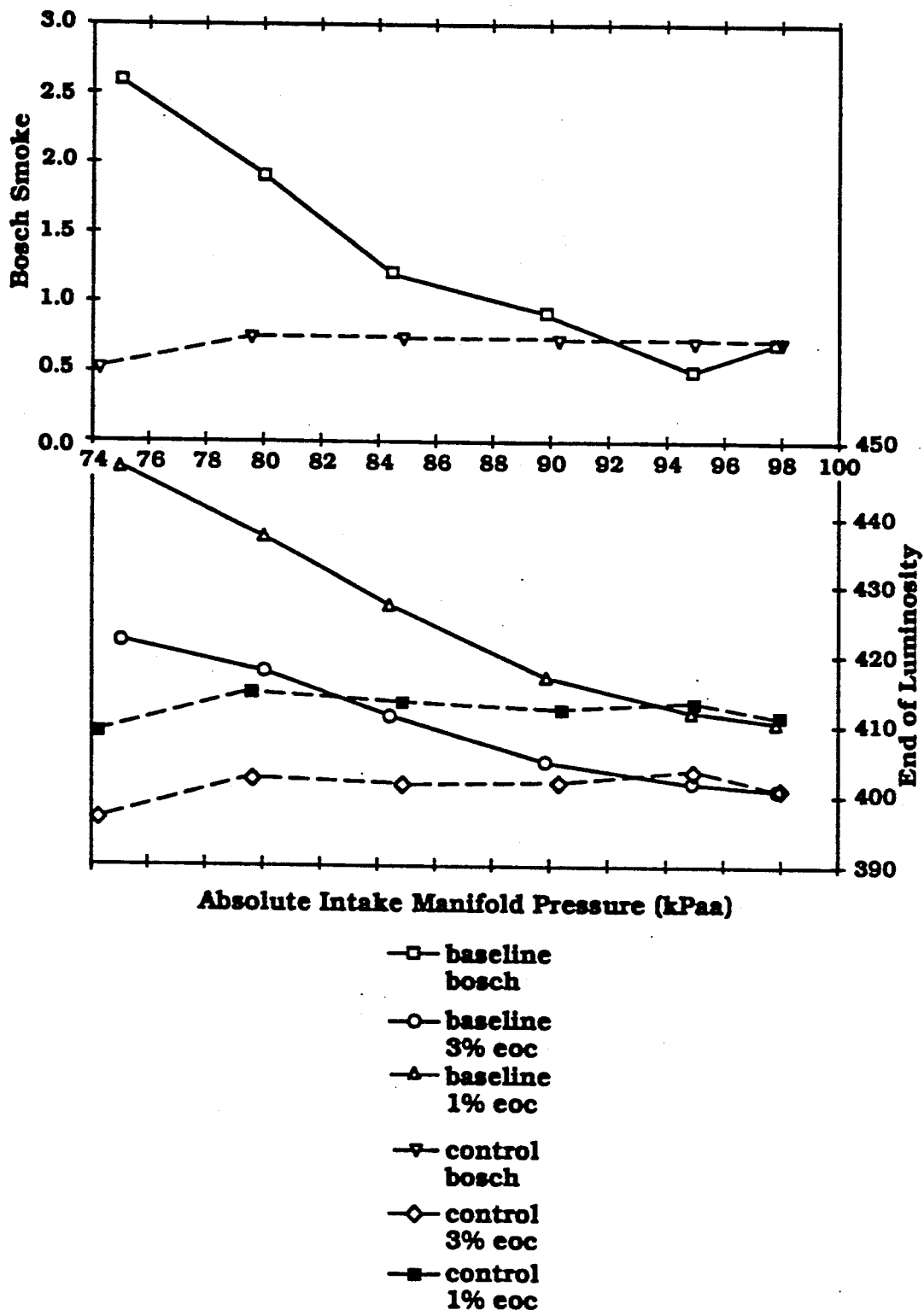
FIG. 4 shows the results of smoke controlled tests, wherein the end of luminosity is shown to correlate strongly with Bosch smoke values.

Using this correlation model, a control strategy was implemented to investigate the benefits of using this luminosity measurement to control Bosch smoke in a diesel engine. Initially, the Bosch smoke level was determined as the intake manifold pressure was reduced while all other engine parameters were held constant. The results of this baseline experiment are shown in FIG. 4. The data shows that as the pressure was reduced the air/fuel ratio was lowered causing increasing amounts of smoke. However, the Bosch smoke level was held constant as the pressure was reduced when fuel delivery to the combustion chamber was reduced. The data was then analyzed to compare the end of luminosity measurement with intake manifold pressure. As shown in FIG. 4, the end of luminosity retarded as the intake manifold pressure was lowered but was held constant as the pressure was lowered when the fuel delivery was reduced. Thus, the results indicate that when the end of luminosity in relation to crank angle is held constant, Bosch smoke is also being held constant. Hence, this end of luminosity measurement can be used not only to measure Bosch smoke but to control it as well.

Although in this case, reduction of smoke was accomplished by decreasing fuel delivery to the combustion chamber, smoke reduction can also be accomplished using the above correlation for adjusting the fuel delivery, the turbo charger waste gate position or other engine parameters which effect the combustion process particularly those that effect the air/fuel ratio.

Although numerous embodiments for measuring and controlling smoke in an internal combustion engine have been described, various changes and modifications may be made without departing from the spirit and scope of the invention as defined by the appended claims.

We claim:

1. A means for measuring smoke emissions from an internal combustion engine having at least one combustion chamber, comprising means for delivering fuel into the combustion chamber, means for delivering air to the combustion chamber, means for causing combustion to occur within the combustion chamber, means for detecting the luminosity including at least a portion of the soot radiation spectrum in the combustion chamber, and means electrically connected to said luminosity detecting means for generating a luminosity signal indicative of the detected luminosity including at least a portion of the soot radiation spectrum in eh combustion chamber and for measuring exhaust soot emissions from the engine on the basis of at least one parameter of the luminosity signal.

2. A means for measuring smoke as recited in claim 1, wherein said internal combustion engine is a diesel engine.

3. A means for measuring smoke as recited in claim 1, wherein said measuring means measures exhaust soot emissions from the engine on the basis of at least one parameter of the luminosity signal in relation to crank angle.

4. A means for measuring smoke as recited in claim 1, wherein the exhaust soot emissions from the engine are measured on the basis of the start and end of luminosity.

5. A means for measuring smoke as recited in claim 4, wherein said measuring means measures exhaust soot emissions from the engine on the basis of start and end of luminosity to maintain a desired end of luminosity at a particular crank angle so as to control exhaust emissions.

6. A means for measuring smoke as recited in claim 1, wherein said measuring means measures exhaust soot emissions independent of engine parameters.

7. A means for measuring smoke as recited in claim 1, wherein said measuring means measures exhaust soot emissions on a cycle to cycle basis.

8. A means for measuring smoke as recited in claim 1, wherein said internal combustion engine has a plurality of combustion chambers, said fuel delivering means delivers fuel into each combustion chamber, said air delivering means delivers air to each combustion chamber, said combustion causing means causes combustion to occur within each combustion chamber, and said detecting means detects the luminosity including at least a portion of the soot radiation spectrum in each combustion chamber.

9. A means for measuring smoke as recited in claim 8, wherein said measuring means measures exhaust soot emissions on a chamber to chamber basis.

10. A means for measuring smoke as recited in claim 1, wherein said measuring means measures exhaust soot emissions from the engine on the basis of at least one parameter of the luminosity signal for adjusting at least one parameter of the engine to maintain at least one parameter of the luminosity signal at a desired crank angle so as to control exhaust emissions.

11. A means for measuring smoke as recited in claim 10, wherein said internal combustion engine is a diesel engine.

12. A means for measuring smoke as recited in claim 10, wherein the exhaust soot emissions from the engine are measured on the basis of the start and end of luminosity.

13. A means for measuring smoke as recited in claim 12, wherein said measuring means measures exhaust soot emissions from the engine on the basis of start and end of luminosity for adjusting at least one parameter of the engine to maintain a desired end of luminosity at a particular crank angle so as to control exhaust emissions.

14. A means for measuring smoke as recited in claim 1, further comprising means for adjusting at least one parameter of the engine to maintain at least one parameter of the luminosity signal at a desired crank angle so as to control exhaust emissions.

15. A means for measuring smoke as recited in claim 14, wherein said means for adjusting at least one parameter of the engine adjusts fuel delivery.

16. A means for measuring smoke as recited in claim 14, wherein means for adjusting at least one parameter of the engine adjusts fuel injection timing.

17. A means for measuring smoke as recited in claim 14, wherein the engine includes a turbocharger waste gate and wherein means for adjusting at least one parameter of the engine adjusts turbocharger waste gate position.

18. A method for measuring smoke emissions from an internal combustion engine having at least one combustion chamber, comprising the steps of delivering fuel into the combustion chamber, delivering air to the combustion chamber, causing combustion to occur within the combustion chamber, detecting the luminosity of soot in the combustion chamber, generating a curve indicative of the detected luminosity including at least a portion of the soot radiation spectrum in the combustion chamber and measuring exhaust soot emission from the engine on the basis of at least one parameter of the luminosity curve.

19. A method for measuring smoke as recited in claim 18, wherein said internal combustion engine is a diesel engine.

20. A method for measuring smoke as recited in claim 18, wherein said measuring step measures exhaust soot emissions from the engine on the basis of at least one parameter of the luminosity curve in relation to crank angle.

21. A method for measuring smoke as recited in claim 18, wherein the exhaust soot emissions from the engine are measured on the basis of the start and end of luminosity.

22. A method for measuring smoke as recited in claim 21, wherein in said measuring step exhaust soot emissions from the engine are measured on the basis of start and end of luminosity to maintain a desired end of luminosity at a particular crank angle so as to control exhaust soot emissions.

23. A method for measuring smoke as recited in claim 18, further comprising the step of adjusting at least one parameter of the engine to maintain at least one parameter of the luminosity curve at a desired crank angle so as to control exhaust soot emissions.

24. A method for measuring smoke as recited in claim 23, wherein said adjusting step comprises adjusting fuel delivery.

25. A method for measuring smoke as recited in claim 23, wherein said adjusting step comprises adjusting fuel injecting timing.

26. A method for measuring smoke as recited in claim 23, wherein said adjusting step comprises adjusting turbocharger waste gate position.

27. A means for measuring particulate emissions from an internal combustion engine having at least one combustion chamber, comprising means for delivering fuel into the combustion chamber, means for delivering air to the combustion chamber, means for causing combustion to occur within the combustion chamber, means for detecting the luminosity including at least a portion of the particulate matter radiation spectrum in the combustion chamber, and means electrically connected to said luminosity detecting means for generating a luminosity signal based on the detected luminosity including at least a portion of the particulate matter radiation spectrum in the combustion chamber and for measuring particulate emissions from the engine on the basis of at least one parameter of the luminosity signal.

28. A means for measuring particulate emissions as recited in claim 27, wherein said measuring means measures particulate emissions during operation of the engine at high smoke conditions.

* * * * *